Patented June 4, 1940

2,203,038

UNITED STATES PATENT OFFICE 2,203,038

WATER-INSOLUBLE AZO DYESTUFFS AND FIBER DYED THEREWITH

Arthur Zitscher, Kronberg in Taunus, Robert Schmitt, Darmstadt, and Herbert Kracker, Frankfort-on-the-Main-Hochst, Germany, assignors to General Aniline & Film Corporation, a corporation of Delaware No Drawing. Application November 21, 1938, Serial No. 241,692. In Germany September 11, 1934

8 Claims. (Cl. 260—193)

The present invention relates to water-insoluble azo dyestuffs and to fiber dyed therewith; more particularly it relates to dyestuffs corresponding to the following general formula:

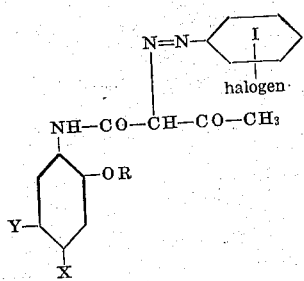

wherein R represents an alkyl radical, X and Y stand for halogen or alkoxy, Y meaning alkoxy in case X stands for halogen, and halogen in case X stands for alkoxy, and wherein the benzene nucleus I may be further substituted by halogen, alkyl, alkoxy or aryloxy groups.

This application is a continuation-in-part of our application Serial No. 39,500, filed September 6, 1935, which has become abandoned.

We have found that valuable water-insoluble azo dyestuffs are obtainable by coupling in substance, on the fiber or on a substratum adapted for the production of lakes arylides of acetoacetic acid of the following formula:

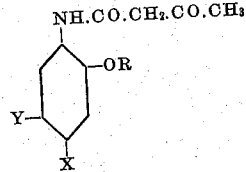

wherein R represents an alkyl radical, X and Y stand for halogen or alkoxy, Y meaning alkoxy in case X stands for halogen, and halogen in case X stands for alkoxy, with diazo-compounds from mono-amines of the benzene series which contain at least one halogen atom and, if desired, halogen, alkyl, alkoxy or aryloxy groups as substituents.

When produced in substance, the new dyestuffs may be used for the preparation of valuable pigments, but they may also be used with advantage for the production of insoluble dyestuffs on the fiber according to the ice-color-method or one of the usual printing methods, for instance, in direct printing, or according to the known nitrosamine-printing-process or the like.

The yellow dyestuffs thus obtained are distinguished by their good all around fastness properties, particularly by unobjectionable fastness to soaping; a great number of them have also a high fastness to light.

The following examples serve to illustrate the invention, but they are not intended to limit it thereto, the parts being by weight, unless otherwise stated:

(1) 17.6 parts of 1-amino-3-methyl-2.4-dichlorobenzene are diazotized in the usual manner and the diazo-solution is coupled with a solution of 32.4 parts of 1-(acetoacetyl-amino)-2.5-dimethoxy-4-bromobenzene in dilute caustic soda solution to which there has been added Turkey red oil and the quantity of sodium acetate which is necessary to bind the mineral acid in excess. The separated dyestuff is filtered off and washed well. When produced in the usual manner, advantageously in the form of a paste, on a substratum, it yields a greenish-yellow lake of high fastness to light. The dyestuff has the following formula:

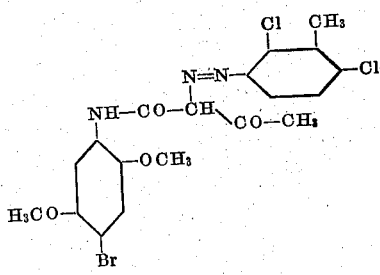

(2) Bleached cotton yarn is grounded in a solution containing per liter 6 grams of 1-(acetoacetyl-amino)-2.5-dimethoxy-4-chlorobenzene,
12 cc. of caustic soda solution of 34° Bé.,
5 cc. of Turkey red oil and
100 grams of sodium chloride, thoroughly squeezed and developed in a diazo-solution neutralized with sodium acetate and containing per liter the diazo compound from 1.42 grams of 1-amino-2-methyl-5-chlorobenzene, rinsed and soaped in a boiling solution containing per liter
1 gram of sodium carbonate,
3 grams of soap and
0.5 gram of sodium hydrosulfite.

The greenish yellow dyeing thus obtained has a very good fastness to light.

The dyestuff may be also produced on other vegetable fibers, on native cellulose, as, for instance, linen or on regenerated cellulose, as, for instance, viscose artificial silk, and also on wool or other animal fibers as, for instance, spun silk, on which a more reddish dyeing is obtained.

(3) Desized and bleached cotton piece goods are padded on a foulard in a solution containing per liter 15 grams of 1-(acetoacetyl-amino)-2.4-dimethoxy-5-chlorobenzene,
22.5 cc. of caustic soda solution of 34° Bé. and
20 cc. of Turkey red oil.

The grounded and dried material is passed through a diazo-solution obtained according to the following manner:

11 grams of 1-amino-2-methoxy-5-chlorobenzene hydrochloride are dissolved in
12 cc. of hydrochloric acid of 20° Bé. and
200 cc. of water, the solution is cooled to 5° C. and diazotized with a solution of
4.3 grams of sodium nitrite in water. Thereupon there are added
8 grams of crystallized sodium acetate and
20 cc. of acetic acid of 50% strength and the whole is made up to 1 liter.

The material is then exposed to the air for a short time, rinsed several times with cold water and finally soaped at boiling temperature.

A yellow dyeing of very good fastness to light is obtained.

(4) Desized and bleached cotton piece goods are printed with the following paste:

20 grams of 2-methyl-4.5-dichlorobenze-1-nitrosamine-sodium,
24 grams of 1-(acetoacetyl-amino)-2.5-dimethoxy-4-chlorobenzene,
30 grams of caustic soda solution of 34° Bé. and
20 grams of Turkey red oil are stirred into a paste with
50 grams of water, dissolved in
356 grams of warm water and made up with
500 grams of neutral starch tragacanth thickening to 1 kilo of printing color.

After drying, the printed material is steamed in a moist state for 3 minutes or exposed to the air over-night and thereupon passed at 80° C. to 90° C. through a solution containing 20 cc. of acetic acid of 50% strength per liter, rinsed and soaped.

A yellow print of very good fastness to washing is obtained.

(5) Desized and bleached cotton fabric is printed with the following paste:

36 grams of the disodium salt of the diazoamino compound from 2-methyl-4-chloro-1-diazobenzene and 1-amino-2-carboxybenzene-4-sulfonic acid,
24 grams of 1-(acetoacetylamino)-2.5-dimethoxy-4-chlorobenzene,
30 grams of caustic soda solution of 34° Bé. and
20 grams of Turkey red oil are stirred into a paste with
50 grams of water and dissolved in
340 grams of warm water and made up with
500 grams of neutral starch tragacanth thickening to 1 kilo.

After drying the printed material is steamed in a rapid ager for 5 minutes in the presence of acetic acid vapor and formic acid vapor, thereupon rinsed and soaped. A greenish yellow print of very good fastness properties is obtained.

The process may be carried out in the same manner with other diazo compounds and other arylides of aceto-acetic acid of this series.

The following table indicates a number of tints of some other azo dyestuffs obtainable according to the present invention:

| | Aceto-acetyl compound of— | Coupled with the diazo-compound of— | Tint |
|---|---|---|---|
| 1 | 1-amino-2.5-dimethoxy-4-chlorobenzene | 1-amino-2-methyl-3-chlorobenzene | Greenish yellow. |
| 2 | ----do---- | 1-amino-3-methyl-2.4-dichlorobenzene | Clear lemon-yellow. |
| 3 | ----do---- | 1-amino-3-methyl-4.6-dichlorobenzene | Yellow. |
| 4 | ----do---- | 1-amino-4-methyl-3-chlorobenzene | Lemon-yellow. |
| 5 | ----do---- | 1-amino-4-methyl-2.5-dichlorobenzene | Yellow. |
| 6 | ----do---- | 1-amino-2.5-diethoxy-4-chlorobenzene | Do. |
| 7 | 1-amino-2.5-dimethoxy-4-bromobenzene | 1-amino-2-chlorobenzene | Greenish yellow. |
| 8 | ----do---- | 1-amino-2-methyl-4-chlorobenzene | Yellow. |
| 9 | ----do---- | 1-amino-2.5-dichlorobenzene | Do. |
| 10 | ----do---- | 1-amino-2-methyl-3-chlorobenzene | Greenish yellow. |
| 11 | ----do---- | 1-amino-2.3.4-trichlorobenzene | Yellow. |
| 12 | ----do---- | 1-amino-2-methoxy-5-chlorobenzene | Greenish yellow. |
| 13 | ----do---- | 1-amino-2-phenoxy-5-chlorobenzene | Reddish yellow. |
| 14 | ----do---- | 1-amino-2-(4'-chlorphenoxy)-5-chlorobenzene | Yellow. |
| 15 | ----do---- | 1-amino-2-(2'-methylphenoxy)-5-chlorobenzene | Reddish yellow. |
| 16 | ----do---- | 1-amino-2-(4'-methoxyphenoxy)-5-chlorobenzene | Do. |
| 17 | ----do---- | 1-amino-2-(naphthyl-2'-hydroxy)-5-chlorobenzene | Do. |
| 18 | ----do---- | 1-amino-2-methyl-4-bromobenzene | Yellow. |
| 19 | ----do---- | 1-amino-2-methyl-5-bromobenzene | Greenish yellow. |
| 20 | ----do---- | 1-amino-2-methyl-4-iodobenzene | Yellow. |
| 21 | ----do---- | 1-amino-4-methyl-2.3-dichlorobenzene | Do. |
| 22 | ----do---- | 1-amino-2-methyl-5-chloro-4-bromobenzene | Do. |
| 23 | ----do---- | 1-amino-2-methoxy-3-chlorobenzene | Do. |
| 24 | ----do---- | 1-amino-4-methoxy-3-chlorobenzene | Greenish yellow. |
| 25 | ----do---- | 1-amino-2-ethoxy-5-chlorobenzene | Do. |
| 26 | ----do---- | 1-amino-2-methoxy-4.5-dichlorobenzene | Yellow. |
| 27 | 1-amino-2.5-diethoxy-4-bromobenzene | 1-amino-2-chloro-benzene | Do. Greenish yellow. |

| | Aceto-acetyl compound of— | Coupled with the diazo-compound of— | Tint |
|---|---|---|---|
| 28 | do | 1-amino-2.5-dichlorobenzene | Yellow. |
| 29 | do | 1-amino-3-methyl-2.4-dichlorobenzene | Greenish yellow. |
| 30 | do | 1-amino-2-methoxy-5-chlorobenzene | Do. |
| 31 | do | 1-amino-4-methyl-2.5-dichlorobenzene | Yellow. |
| 32 | do | 1-amino-2-ethoxy-4-bromo-5-chlorobenzene | Do. |
| 33 | 1-amino-2.4-dimethoxy-5-chlorobenzene | 1-amino-2-methoxy-5-chlorobenzene | Do. |
| 34 | do | 1-amino-2-methyl-3-chlorobenzene | Greenish yellow. |
| 35 | do | 1-amino-2-methyl-4-bromobenzene | Do. |
| 36 | do | 1-amino-2-methyl-3.4-dichlorobenzene | Do. |
| 37 | do | 1-amino-2-methyl-4.5-dichlorobenzene | Reddish yellow. |
| 38 | do | 1-amino-2-methyl-4.6-dichlorobenzene | Yellow. |
| 39 | do | 1-amino-4-methyl-2.5-dichlorobenzene | Reddish yellow. |
| 40 | do | 1-amino-2-phenoxy-3-chlorobenzene | Greenish yellow. |
| 41 | do | 1-amino-2-methoxy-4.5-dichlorobenzene | Yellow. |
| 42 | 1-amino-2.5-dimethoxy-4-chlorobenzene | 1-amino-2-methyl-4-bromo-5-chlorobenzene | Do. |
| 43 | do | 1-amino-2.4-dichlorobenzene | Greenish yellow. |
| 44 | do | 1-amino-2.4.5-trichlorobenzene | Reddish yellow. |
| 45 | do | 1-amino-2-methoxy-4.5-dichlorobenzene | Yellow. |
| 46 | do | 1-amino-2-methoxy-4-bromo-5-chlorobenzene | Do. |
| 47 | 1-amino-2.5-diethoxy-4-chlorobenzene | 1-amino-2-methyl-4.5-dichlorobenzene | Reddish yellow. |
| 48 | do | 1-amino-3-methyl-2.4-dichlorobenzene | Yellow. |
| 49 | do | 1-amino-2.4-dichlorobenzene | Greenish yellow. |
| 50 | do | 1-amino-2.4.5-trichlorobenzene | Orange yellow. |
| 51 | do | 1-amino-2-methoxy-4.5-dichlorobenzene | Greenish yellow. |

Since an object of the present invention is to provide dyestuffs of good fastness properties which dyestuffs are insoluble in water and alkalies, it is to be understood that the aromatic nuclei of the general formulae appearing in the appended claims do not contain any substituents which are known to render organic compounds soluble in water or alkalies and to tend to depreciate the fastness of the dyestuffs to alkalies. Substituents of this kind are, for instance, the sulfonic acid and the carboxylic acid group.

We claim:
1. The water-insoluble azo dyestuffs of the following general formula:

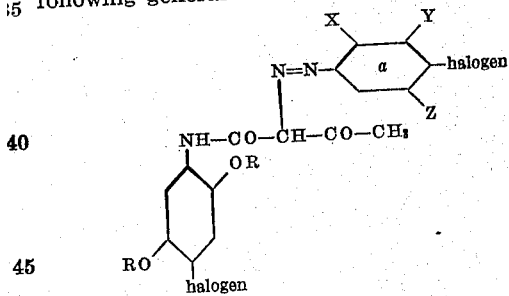

wherein R represents a member of the group consisting of methyl and ethyl, X stands for one of the group consisting of chlorine, methyl, methoxy and ethoxy, Y for one of the group consisting of hydrogen and methyl and Z for one of the group consisting of hydrogen and chlorine, the benzene nucleus $a$ always containing one methyl group and two halogen atoms, yielding, when produced on the fiber, yellow dyeings of good fastness properties, particularly of very good fastness to soaping and to light.

2. The water-insoluble azo dyestuffs of the following general formula:

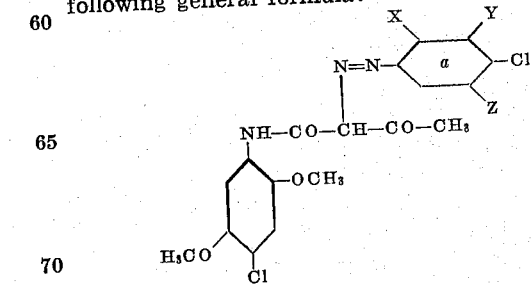

wherein X stands for one of the group consisting of chlorine, methyl, methoxy and ethoxy, Y stands for one of the group consisting of hydrogen and methyl and Z for one of the group consisting of hydrogen and chlorine, the benzene nucleus $a$ always containing one methyl group and two chlorine atoms, yielding, when produced on the fiber, yellow dyeings of good fastness properties, particularly of very good fastness to soaping and to light.

3. The water-insoluble azo dyestuff of the following formula:

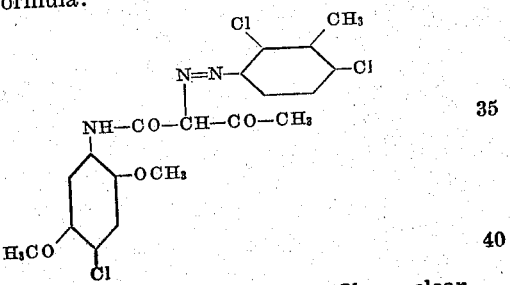

yielding, when produced on the fiber, clear lemon-yellow dyeings of good fastness properties, particularly of very good fastness to soaping and to light.

4. The water-insoluble azo dyestuff of the following formula:

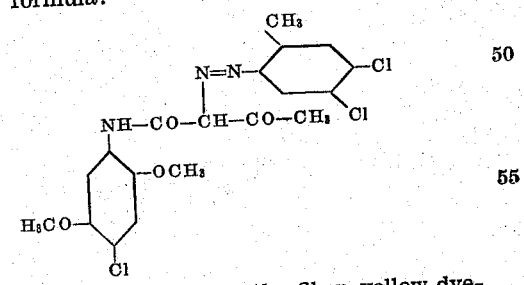

yielding, when produced on the fiber, yellow dyeings of good fastness properties, particularly of very good fastness to soaping and to light.

5. Fiber dyed with the water-insoluble azo dyestuffs as claimed in claim 1.
6. Fiber dyed with the water-insoluble azo dyestuffs as claimed in claim 2.
7. Fiber dyed with the water-insoluble azo dyestuff as claimed in claim 3.
8. Fiber dyed with the water-insoluble azo dyestuff as claimed in claim 4.

ARTHUR ZITSCHER.
ROBERT SCHMITT.
HERBERT KRACKER.